(12) United States Patent
Nagasawa

(10) Patent No.: US 11,230,257 B2
(45) Date of Patent: Jan. 25, 2022

(54) SEAT BELT DEVICE

(71) Applicant: SUBARU CORPORATION, Tokyo (JP)

(72) Inventor: Isamu Nagasawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/082,388

(22) Filed: Oct. 28, 2020

(65) Prior Publication Data

US 2021/0197759 A1    Jul. 1, 2021

(30) Foreign Application Priority Data

Dec. 27, 2019 (JP) .............................. JP2019-238344

(51) Int. Cl.
*B60R 22/195*    (2006.01)
*B60R 21/013*    (2006.01)
*B60R 22/12*     (2006.01)

(52) U.S. Cl.
CPC ........ *B60R 22/1951* (2013.01); *B60R 21/013* (2013.01); *B60R 22/12* (2013.01); *B60R 22/1952* (2013.01)

(58) Field of Classification Search
CPC .............. B60R 22/195; B60R 22/1951; B60R 22/1952
See application file for complete search history.

(56) References Cited

U.S. PATENT DOCUMENTS

| | | | | |
|---|---|---|---|---|
| 5,188,425 A * | 2/1993 | Foster | ................. | B60R 22/1952 297/473 |
| 5,364,129 A * | 11/1994 | Collins | ............... | B60R 22/1952 180/268 |
| 5,496,068 A * | 3/1996 | Ball | ................... | A44B 11/2523 24/633 |
| 5,634,690 A * | 6/1997 | Watanabe | ........... | B60R 22/1952 242/374 |
| 6,089,605 A * | 7/2000 | Muller | ................. | B60N 2/4214 280/806 |
| 6,382,674 B1 * | 5/2002 | Specht | ............... | B60R 22/1951 280/806 |
| 6,460,935 B1 * | 10/2002 | Rees | ................... | B60R 22/1952 280/806 |
| 7,188,868 B2 * | 3/2007 | Yamaguchi | ........... | B60R 22/195 280/806 |

(Continued)

FOREIGN PATENT DOCUMENTS

JP    2007-196881 A    8/2007

*Primary Examiner* — Barry Gooden, Jr.
(74) *Attorney, Agent, or Firm* — Smith, Gambrell & Russell, LLP

(57) ABSTRACT

A seat belt device includes a webbing and a tongue. The webbing includes a lap belt and a shoulder belt. At least a portion of the lap belt is configured to be disposed to extend in a vehicle-width direction along a front of an abdomen of an occupant. At least a portion of the shoulder belt is configured to be disposed obliquely along a front of a chest of the occupant. The tongue is provided between the lap belt and the shoulder belt of the webbing and is configured to be coupled to a vehicle body when the tongue is to be mounted. The tongue rotates in accordance with a collision or a warning of the collision of a vehicle in a direction in which the shoulder belt is twisted with respect to the vehicle body.

16 Claims, 10 Drawing Sheets

(56) References Cited

U.S. PATENT DOCUMENTS

| | | | |
|---|---|---|---|
| 9,950,682 B1* | 4/2018 | Gramenos | B60R 21/01546 |
| 2006/0138852 A1* | 6/2006 | Ichida | A44B 11/2557 |
| | | | 297/483 |
| 2006/0279130 A1* | 12/2006 | Webber | B60R 22/1952 |
| | | | 297/469 |
| 2011/0316265 A1* | 12/2011 | Lane, Jr. | B60R 22/1955 |
| | | | 280/806 |
| 2012/0119478 A1* | 5/2012 | Lane, Jr. | B60R 22/1952 |
| | | | 280/806 |
| 2012/0146318 A1* | 6/2012 | Kim | B60R 22/1951 |
| | | | 280/806 |
| 2016/0016534 A1* | 1/2016 | Nagasawa | B60R 22/023 |
| | | | 297/465 |
| 2016/0214554 A1* | 7/2016 | Shimazu | B60R 22/03 |
| 2020/0062149 A1* | 2/2020 | Sekizuka | B60N 2/4221 |
| 2020/0130636 A1* | 4/2020 | Moeker | B60R 22/1952 |
| 2020/0130640 A1* | 4/2020 | Yamamoto | B60R 22/28 |

* cited by examiner

SEAT BELT DEVICE

CROSS-REFERENCE TO RELATED APPLICATIONS

The present application claims priority from Japanese Patent Application No. 2019-238344 filed on Dec. 27, 2019, the entire contents of which are hereby incorporated by reference.

BACKGROUND

The disclosure relates to a seat belt device that is worn by an occupant that is seated on a seat of a vehicle.

For example, in order to restrain an occupant that is seated on a seat of a vehicle, such as an automobile, and reduce the possibility of the occupant being injured in, for example, a collision, a three-point seat belt is widely used.

A three-point seat belt includes a lap belt that is provided to extend in a vehicle-width direction along the front of the abdomen of an occupant and a shoulder belt that is provided obliquely along the front of the chest of the occupant.

As a related art regarding a three-point seat belt, for example, Japanese Unexamined Patent Application Publication No. 2007-196881 describes that in order to reduce the size of a gap between a shoulder webbing and an occupant and increase the ability to restrain the occupant at the time of operation thereof, when the webbing is worn around the occupant, a buckle driving device moves a buckle device inward in a vehicle-width direction to reduce the size of the gap between the shoulder webbing and the occupant and to further move the shoulder webbing as a whole toward the upper side of the vehicle. Therefore, the ability to restrain the occupant by the shoulder webbing is increased.

SUMMARY

An aspect of the disclosure provides a seat belt device including a webbing and a tongue. The webbing includes a lap belt and a shoulder belt. At least a portion of the lap belt is configured to be disposed to extend in a vehicle-width direction along a front of an abdomen of an occupant. At least a portion of the shoulder belt is configured to be disposed obliquely along a front of a chest of the occupant. The tongue is provided between the lap belt and the shoulder belt of the webbing and is configured to be coupled to a vehicle body when the tongue is mounted. The tongue rotates in accordance with a collision or a warning of the collision of a vehicle in a direction in which the shoulder belt is twisted with respect to the vehicle body.

BRIEF DESCRIPTION OF THE DRAWINGS

The accompanying drawings are included to provide a further understanding of the disclosure and are incorporated in and constitute a part of this specification. The drawings illustrate embodiments and, together with the specification, serve to explain the principles of the disclosure.

DETAILED DESCRIPTION

In a frontal collision, a seat belt device is an effective device for reducing injuries to the chest of an occupant or secondary collisions with other components in the interior of a vehicle.

However, for a three-point seat belt including a shoulder belt disposed obliquely, when a tongue-side (low-side) portion of the shoulder belt is raised relatively to the chest due to, for example, an occupant moving so that the upper part of the occupant's body is tilted forward, or an increase in tension caused by the operation of a pretensioner or a forward movement of the occupant resulting from a collision, the seat belt may compress the vicinity of a rib upward and thus a bending force may be generated at the rib.

In view of the problem above, it is desirable to provide a seat belt device that makes it possible to reduce compression of the chest by a shoulder belt.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

First Embodiment

A first embodiment of the disclosure is described below.

A seat belt device of the first embodiment is, for example, a three-point seat belt that is provided at a front seat on which an occupant facing the front is to be seated in an automobile, such as a passenger car.

Figure 1:
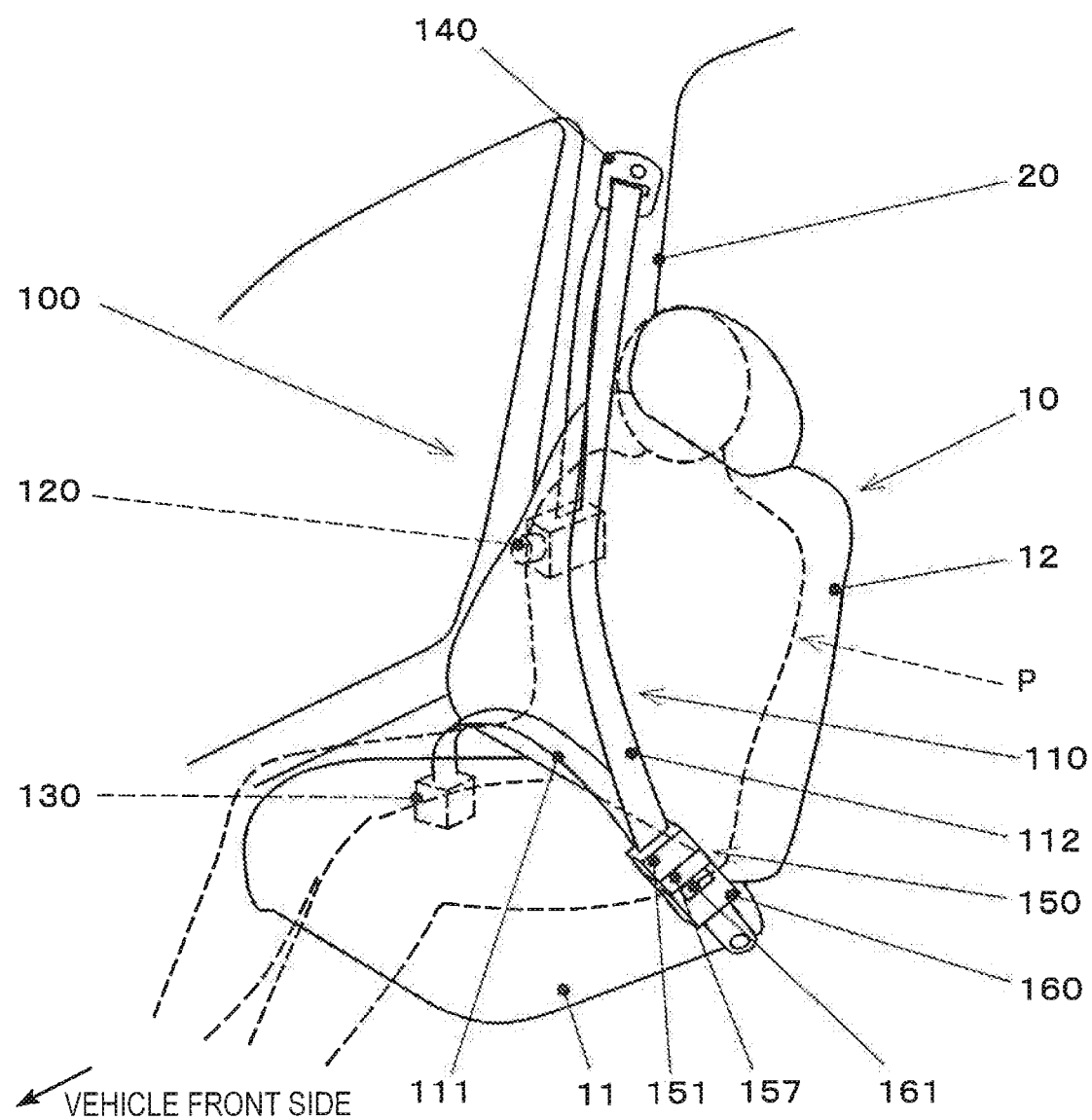
FIG. 1 is a perspective view schematically illustrating a structure of a seat belt device according to a first embodiment of the disclosure.

FIG. 1 is a perspective view schematically illustrating a structure of the seat belt device of the first embodiment.

A seat 10 on which an occupant P is to be seated includes a cushion 11 and a seat back 12.

The cushion 11 is a portion that is provided at a lower portion of the seat 10 and that includes a seat portion on which the buttocks and the femoral region of the occupant P are to be placed.

The seat back 12 is a portion that is provided to protrude upward from the vicinity of a back end of the seat portion and that holds, for example, the back and the shoulders of the occupant P.

A B pillar 20 is provided on one side of the seat 10 in a vehicle-width direction.

The B pillar 20 is a columnar vehicle-body structural member that extends in an up-down direction along a back edge of a door opening through which the occupant P gets into and out of the automobile.

For example, the seat belt device 100 includes a webbing 110, a retractor 120, a lap pretensioner 130, a shoulder anchor 140, a locking tongue 150, and a buckle 160.

The webbing 110 is a belt-shaped member that is made flexible as a result of, for example, being knitted from polyester fiber.

The webbing 110 includes a lap belt 111 and a shoulder belt 112 with the locking tongue 150 as a boundary, the locking tongue 150 being where an intermediate portion of the webbing 110 is inserted and folded.

The lap belt 111 is disposed to extend in the vehicle-width direction primarily along the front of the abdomen of the occupant P.

The shoulder belt 112 is disposed primarily along the front of the chest of the occupant P.

The shoulder belt 112 is disposed obliquely so that a B-pillar-20 side in the vehicle-width direction is higher.

A shoulder-belt-112-side end of the webbing 110 is coupled to the retractor 120, and the retractor 120 is mounted on a lower portion of the B pillar 20.

The retractor 120 retracts an excess portion of the webbing 110.

The webbing 110 is capable of being pulled upward from the retractor 120.

The retractor 120 is provided with a shoulder pretensioner 121 (see FIG. 4) that by using, for example, an actuator using an explosive gas-generating device, pulls the shoulder belt 112 in accordance with a command output from a seat belt control unit 210.

The lap pretensioner 130 is provided in the vicinity of a lower end of the B pillar 20 of a vehicle body, and a vehicle-width-direction outer end of the lap belt 111 of the webbing 110 is coupled to the lap pretensioner 130.

The lap pretensioner 130 pulls the lap belt 111 in accordance with a command output from the seat belt control unit 210, by using, for example, an actuator using an explosive gas-generating device.

The shoulder anchor 140 is a portion that is provided in the vicinity of an upper end of the B pillar 20 of the vehicle body, and is a portion where the shoulder belt 112 of the webbing 110 pulled upward from the retractor 120 is folded toward the locking tongue 150 disposed obliquely below the shoulder belt 112.

The shoulder anchor 140 is capable of rotating around an axis extending substantially in the vehicle-width direction with respect to the B pillar 20 and reduces interference with the passage of the webbing 110 between the retractor 120 and the locking tongue 150.

The locking tongue 150 is a member that is removably mounted on the buckle 160 with the webbing 110 being inserted therein and is coupled to the vehicle body.

In the webbing 110, a region on the side of the pretensioner 130 with respect to the locking tongue 150 functions as the lap belt 111, and a region on the side of the shoulder anchor 140 with respect to the locking tongue 150 functions as the shoulder belt 112.

The locking tongue 150 is configured so as to reduce interference with the passage of the webbing at the time of ordinary use of the vehicle (in a non-collision state of the vehicle), and restricts (locks) a back-and-forth movement at the lap belt 111 and the shoulder belt 112 by restraining the webbing 110 when the tension of the webbing 110 is increased due to, for example, a collision of the vehicle.

A detailed structure of the locking tongue 150 is described in detail later.

The buckle 160 is mounted at a location situated on an inner side in the vehicle-width direction of the cushion 11 of the seat 10 in the vehicle body and in the vicinity of a back end of the cushion 11.

The buckle 160 includes, for example, an engaging mechanism that, when a tongue plate 156 of the locking tongue 150 is inserted, engages therewith, and a release mechanism that releases the engaging mechanism.

A release button 161 that causes the release mechanism to perform a release operation is provided on a vehicle-width-direction inner surface of the buckle 160.

Next, a structure of the locking tongue 150 is described.

Figure 2:
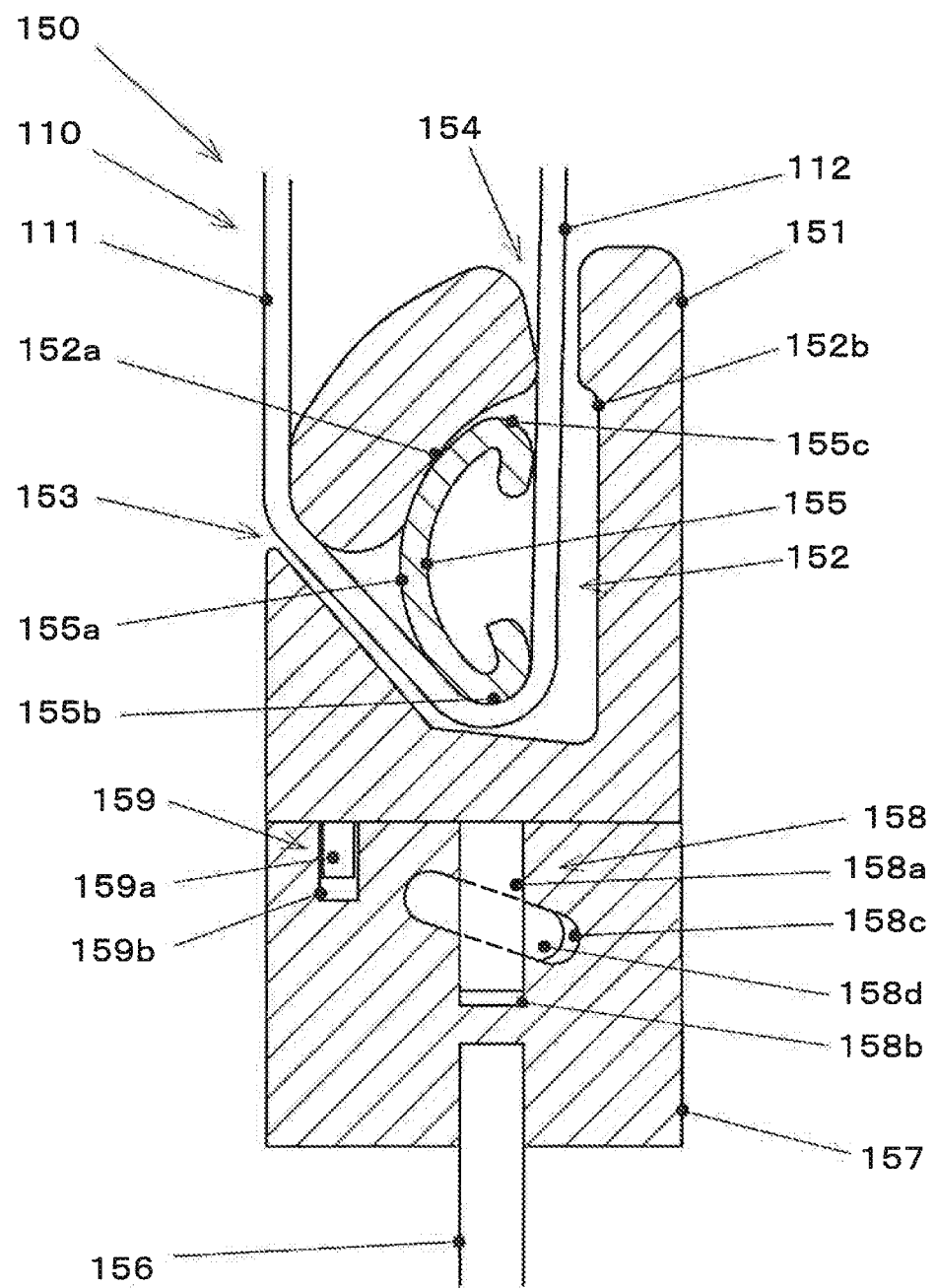
FIG. 2 is a schematic sectional view of a locking tongue in the seat belt device of the first embodiment, and illustrates a free state.
Figure 3:
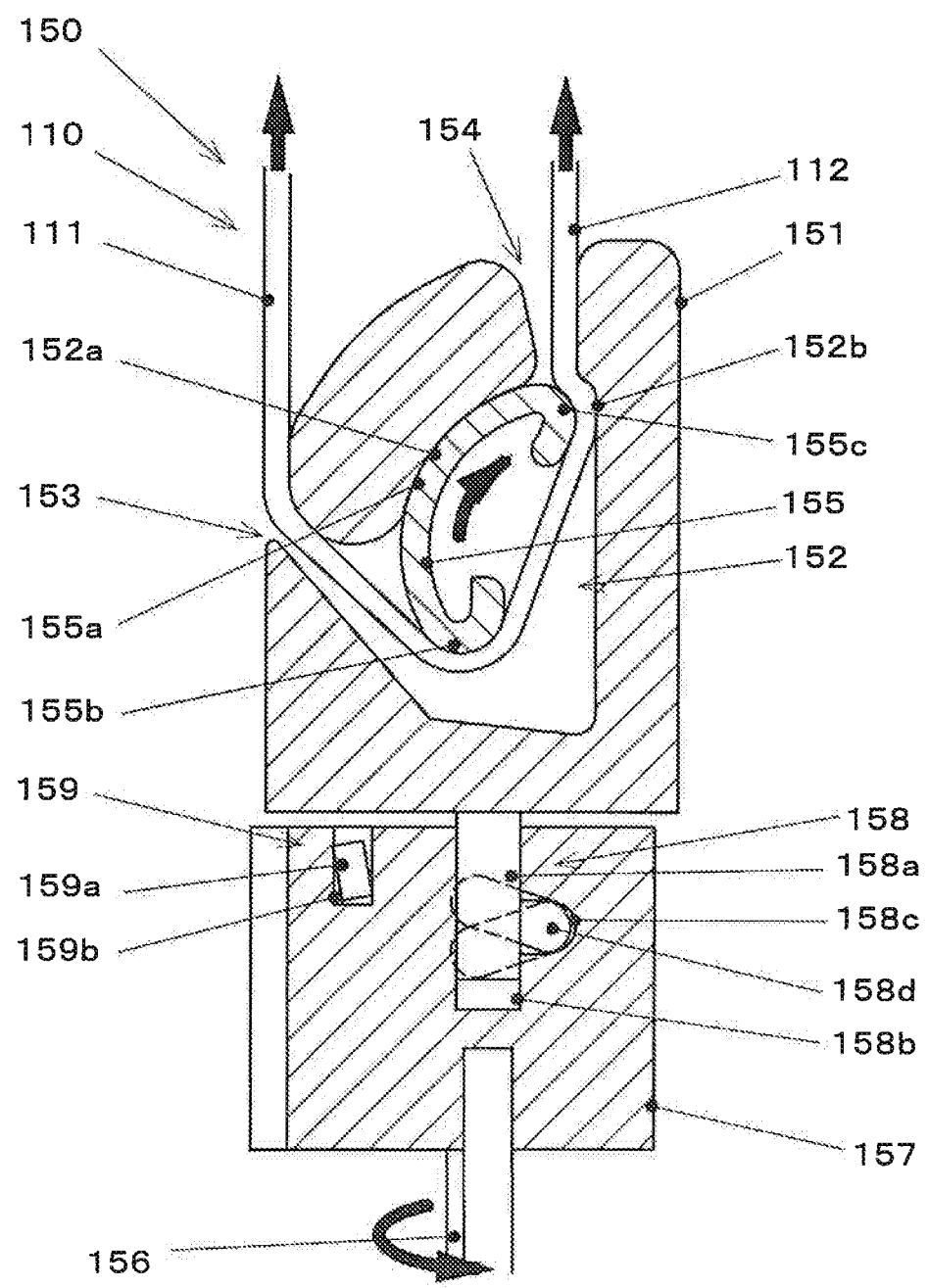
FIG. 3 is a schematic sectional view of the locking tongue in the seat belt device of the first embodiment, and illustrates a lock state.

FIGS. 2 and 3 are each a schematic sectional view of the locking tongue in the seat belt device of the first embodiment, FIG. 2 illustrating a free state and FIG. 3 illustrating a lock state.

The locking tongue 150 includes, for example, a main body 151, a space 152, a lap belt slit 153, a shoulder belt slit 154, a lock member 155, the tongue plate 156, a tongue plate holder 157, a tongue rotation mechanism 158, and a rotation lock mechanism 159.

The main body 151 is a portion where the webbing 110 is inserted therein with the webbing 110 folded between the lap belt 111 and the shoulder belt 112.

The main body 151 is made of a combination of, for example, a metal material and a hard resin material to have sufficient strength with respect to a maximum tension that acts on the webbing 110 when, for example, a collision accident occurs (this is illustrated in a simplified manner in FIGS. 2 and 3).

The space 152 is a hollow portion formed in the main body 151 and accommodates, for example, a part of the webbing 110 and the lock member 155.

A sliding surface 152a and a lock recess 152b are formed at an inner surface defining the space 152.

The sliding surface 152a is a portion that has a concave shape, that comes into contact with a sliding surface 155a of the lock member 155, and that slides mutually with the sliding surface 155a when the lock member 155 operates.

The sliding surface 152a is formed at an inner surface of a region between the lap belt slit 153 and the shoulder belt slit 154 in the main body 151.

The lock recess 152b is a portion that, when a tension that is greater than or equal to a predetermined tension has been applied to the webbing 110 and the lock member 155 has moved, works together with the lock member 155, allows the webbing 110 to be interposed between it and the lock member 155, and locks the webbing 110.

The lock recess 152b is formed at the inner surface defining the space 152 in a region adjacent to the sliding surface 152a and the shoulder belt slit 154 that are interposed between corresponding portions of the lock recess 152b.

The lap belt slit 153 and the shoulder belt slit 154 are openings that are formed from a surface of the main body 151 to an inner portion of the space 152 to extend therethrough, and allow the webbing 110 to be inserted therein.

The lap belt slit 153 and the shoulder belt slit 154 are formed as slits having the shape of long holes having a longitudinal direction in a width direction of the webbing 110 (a direction orthogonal to a sheet plane in FIGS. 2 and 3).

The lap belt slit 153 is provided for introducing an end of the lap belt 111 into the space 152.

The shoulder belt slit 154 is provided for introducing an end of the shoulder belt 112 into the space 152.

The lock member 155 is disposed in the space 152 and moves from a release position to a lock position in accordance with an increase in the tension of the webbing 110, the release position being where the passage of the webbing 110 is allowed and the lock position being where the webbing 110 is locked.

The lock member 155 includes, for example, the sliding surface 155a, a webbing contact member 155b, and a webbing restrainer 155c.

The sliding surface 155a is a convex-shaped portion that in a slidable state comes into contact with the sliding surface 152a defining the space 152 of the main body 151.

The webbing contact member 155b is a convex-shaped portion that is provided at one end side (lower end in FIGS. 2 and 3) of the sliding surface 155a and comes into contact with a fold portion of the webbing 110.

The webbing restrainer 155c is a restrainer that, when the locking tongue 150 is in a lock state, works together with the lock recess 152b, allows the webbing 110 to be interposed between it and the lock recess 152b, and locks the webbing 110 to reduce passage and movement of the webbing 110 through the locking tongue 150 at a location between the lap belt 111 and the shoulder belt 112.

The webbing restrainer 155c is provided on an end side of the sliding surface 155a (upper end in FIGS. 2 and 3) opposite to a webbing-contact-member-155b side of the sliding surface 155a.

The webbing 110 is folded from a lap-belt-111 side to a shoulder-belt-112 side at the webbing contact member 155b.

When the locking tongue 150 is in a free state, the webbing 110 slides along a surface of the webbing contact member 155b and thus is brought into a state in which the webbing 110 can freely pass through the locking tongue 150 (can pass toward the side of the lap belt 111 or the side of the shoulder belt 112).

When the tension that acts on the webbing 110 is increased in a vehicle collision, the locking tongue 150 is brought from the free state illustrated in FIG. 2 to the lock state illustrated in FIG. 3.

The tension of the webbing 110 causes the lock member 155 to be lifted in FIGS. 2 and 3 and the sliding surfaces 152a and 155a move while sliding mutually.

At a termination of a range of movement of the lock member 155, the webbing restrainer 155c of the lock member 155 restrains the webbing 110 between it and the lock recess 152b formed at the space 152.

The tongue plate 156 is a member that protrudes from a lower end of the locking tongue 150 at the time of use thereof and that engages with the engaging mechanism of the buckle 160.

The tongue plate 156 is formed into a planar shape by using, for example, a metal material, such as a steel plate.

The tongue plate holder 157 is a portion provided on a lower side (buckle-160 side) at the time of use thereof with respect to the main body 151 of the locking tongue 150, and holds the tongue plate 156.

An upper portion of the tongue plate 156 is embedded in and fixed to the tongue plate holder 157.

The tongue rotation mechanism 158 is provided between the main body 151 and the tongue plate holder 157 of the locking tongue 150, and rotates the main body 151 around a predetermined rotation axis with respect to the tongue plate holder 157 in accordance with an increase in the tension of the webbing 110.

The tongue rotation mechanism 158 includes, for example, a shaft 158a, a hole 158b, a cam groove 158c, and a cam follower protrusion 158d.

The shaft 158a is a circular columnar portion that protrudes from a lower surface (surface facing the tongue plate holder 157) of the main body 151.

At the time of ordinary use of the seat belt device (when the seat belt device is mounted in a non-collision state of the vehicle), the shaft 158a is disposed in a tilted manner so that an upper end (main-body-151-side end) thereof is disposed on a vehicle front side and a left-right-direction occupant side (seat-10 center side) with respect to a lower end (tongue-plate-holder-157-side end) thereof.

In side view when the locking tongue 150 is seen from the vehicle-width direction, the shaft 158a is disposed in an offset manner toward an upper edge of the shoulder belt 112 with respect to a central portion of the shoulder belt 112.

The hole 158b is formed in an upper surface (surface facing the main body 151) of the tongue plate holder 157, and the shaft. 158a is inserted in the hole 158b.

The cam groove 158c is a grooved portion that is formed by causing a part of an inner peripheral surface defining the hole 158b to be recessed, and that extends spirally.

The cam follower protrusion 158d is a protruding portion that protrudes from an outer peripheral surface of the shaft 158a and that is capable of moving relatively along the cam groove 158c in the cam groove 158c.

The cam groove 158c and the cam follower protrusion 158d work together and function as a cam mechanism that rotates the main body 151 around a center axis of the shaft 158a with respect to the tongue plate holder 157 in accordance with an increase in the tension of the webbing 110.

The tongue rotation mechanism 158 rotates the main body 151 in accordance with an increase in the tension of the webbing 110 in a direction in which a front edge of the shoulder belt 112 retreats in the vicinity of the main body 151.

At the time of ordinary use of the seat belt device 100 (in a non-collision state of the vehicle), the rotation lock mechanism 159 restricts relative rotation of the main body 151 with respect to the tongue plate holder 157.

The rotation lock mechanism 159 includes, for example, a pin 159a and a hole 159b.

The pin 159a is an axial portion that protrudes from the lower surface of the main body 151.

The hole 159b is a portion that is formed in the upper surface of the tongue plate holder 157 and in which the pin 159a is inserted.

The pin 159a is made of, for example, a hard resin material and is formed so as to break in accordance with an application of a shearing load that is greater than or equal to a predetermined shearing load.

As illustrated in FIG. 3, the broken pin 159a falls into the hole 159b.

The seat belt device 100 includes a control system described below.

Figure 4:
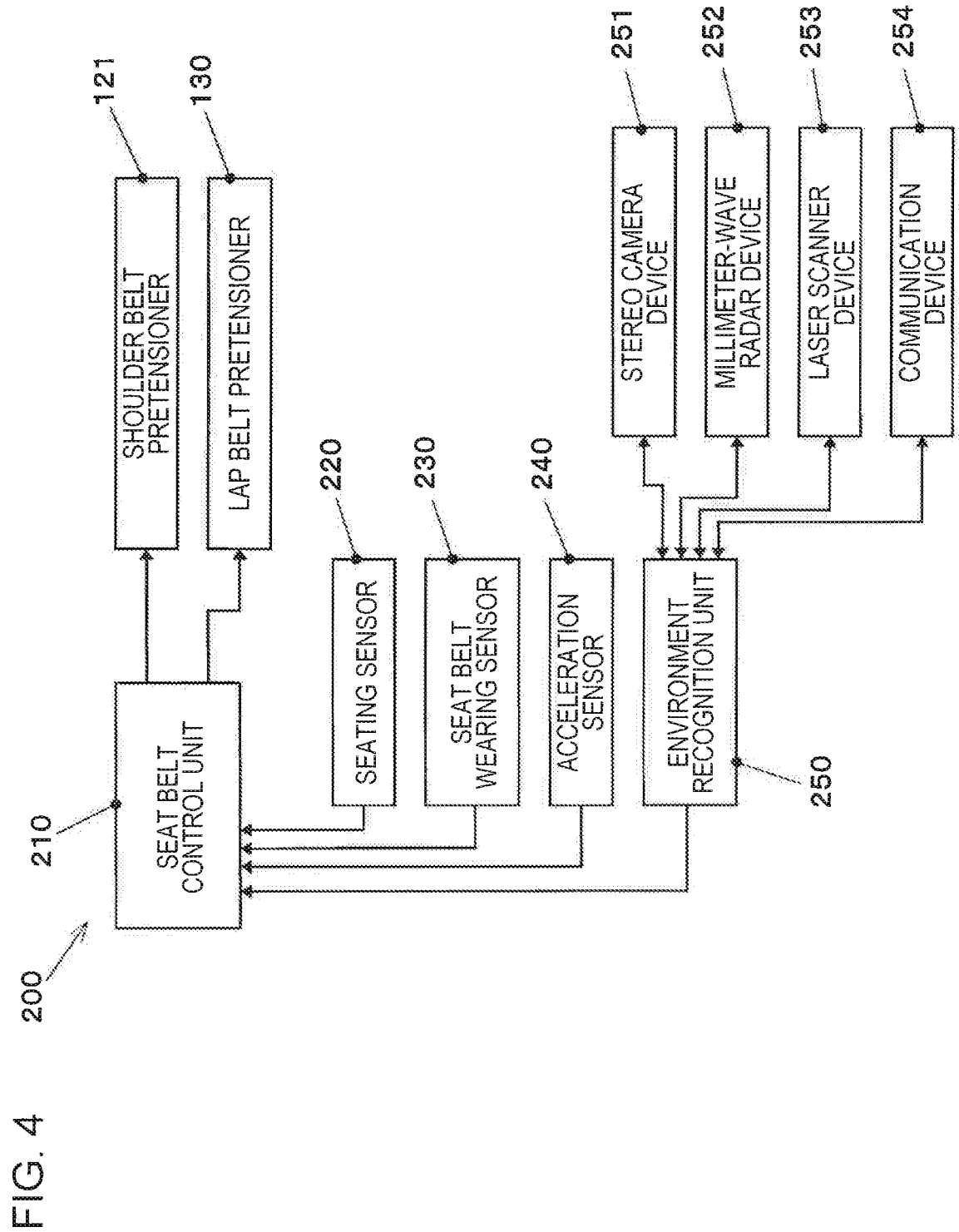
FIG. 4 is a block diagram schematically illustrating a configuration of a control system in the seat belt device of the first embodiment.

FIG. 4 is a block diagram schematically illustrating a configuration of the control system in the seat belt device of the first embodiment.

The control system 200 includes, for example, the seat belt control unit 210, a seating sensor 220, a seat belt wearing sensor 230, an acceleration sensor 240, and an environment recognition unit 250.

The seat belt control unit 210 detects a collision or a warning of a collision and issues a command to each actuator of the seat belt device 100.

The seating sensor 220 is a load sensor that is provided at the cushion 11 of the seat 10 and detects whether the occupant P is seated on the seat 10.

The seat belt wearing sensor 230 is provided at the buckle 160 and detects a state in which the locking tongue 150 is coupled to the buckle 160 (seat belt wearing state).

The acceleration sensor 240 is provided at, for example, a front end of the vehicle body and detects acceleration in, for example, a front-back direction to which the vehicle body is subjected.

The acceleration sensor 240 is used as a sensor that detects a collision of the vehicle.

The environment recognition unit 250 recognizes, for example, information regarding road shapes, other vehicles, pedestrians, buildings, topography, and trees around one's vehicle by utilizing communication, such as communication with various sensors, inter-vehicle communication, or road-to-vehicle communication.

For example, a stereo camera device 251, a millimeter-wave radar device 252, a laser scanner device 253, and a communication device 254 are coupled to the environment recognition unit 250.

The stereo camera device 251 includes a pair of cameras whose imaging range is toward the front of the vehicle and that are disposed apart from each other in the vehicle-width direction, and an image processor that performs a publicly known stereo image processing operation on an image captured by each camera.

The millimeter-wave radar device 252 detects, for example, a relative position or a relative speed of an obstacle with respect to one's vehicle by using, for example, radio waves having a frequency of 30 to 300 GHz, the obstacle existing, for example, on the front side with respect to one's vehicle.

The laser scanner device 253 is a 3D LIDAR that detects the shape and the position of an obstacle around one's vehicle by applying a pulsed laser light and measuring light scattered from the obstacle.

The communication device 254 acquires information regarding an obstacle that is difficult to detect by each sensor above (for example, another vehicle appearing from a location that has been hid by a building).

The environment recognition unit 250 detects a state in which a collision is very likely to occur (detects a warning of a collision) prior to an actual collision of the vehicle.

In accordance with the warning of a collision, the seat belt control unit 210 causes the shoulder pretensioner 121 and the lap pretensioner 130 to be operated.

Figure 5:
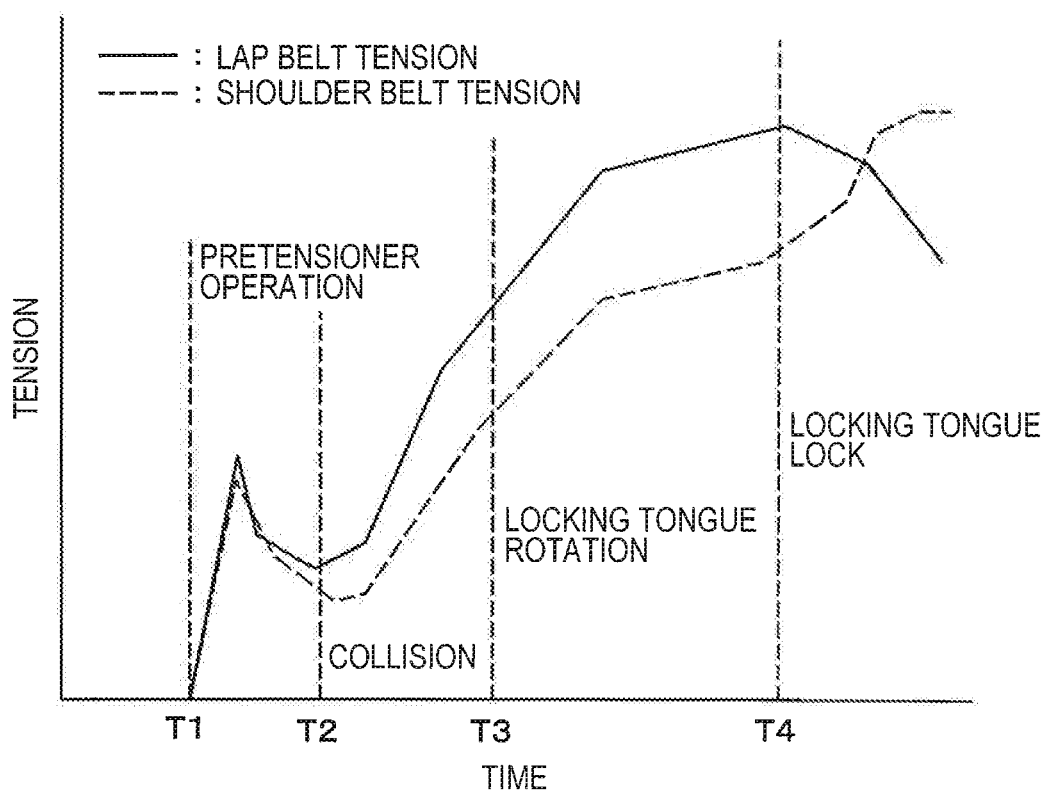
FIG. 5 is a graph illustrating an example of changes in a webbing tension in a collision in the seat belt device of the first embodiment.

FIG. 5 is a graph illustrating an example of changes in webbing tension in a collision in the seat belt device of the first embodiment.

In FIG. 5, the horizontal axis indicates time and the vertical axis indicates tension. In FIG. 5, the tension of the lap belt is indicated by a solid line and the tension of the shoulder belt is indicated by a broken line.

First, at time T1, when the environment recognition unit 250 determines a state in which a frontal collision with, for example, another vehicle is unlikely to be avoided (a pre-crash state), the shoulder pretensioner 121 and the lap pretensioner 130 operate for reducing slack of the webbing 110, and thus the tension of the lap belt 111 and the tension of the shoulder belt 112 are temporarily increased and are subsequently reduced slightly.

At time T2, when the vehicle actually collides with an obstacle, the vehicle body is accelerated in the front-back direction, and a relative forward movement of the occupant P with respect to the seat 10 is started.

Therefore, both the tension of the lap belt 111 and the tension of the shoulder belt 112 start to increase. At this time, the tension of the lap belt 111 is larger than the tension of the shoulder belt 112.

At time T3, the pin 159*a* of the rotation lock mechanism 159 breaks for an unlocking operation, and the tongue rotation mechanism 158 causes the main body 151 to start rotating (oscillating) with respect to the tongue plate holder 157.

Figure 6:
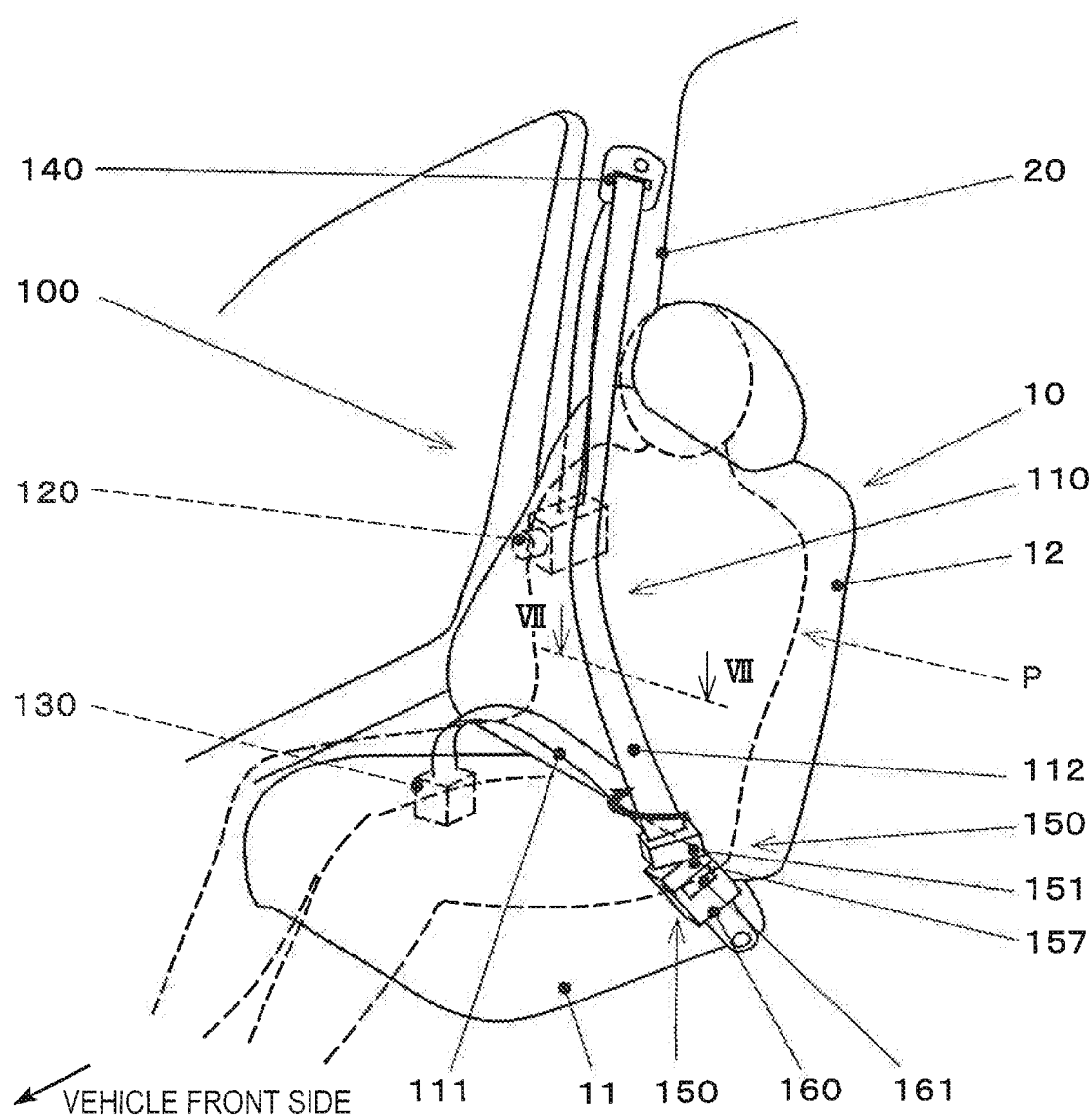
FIG. 6 is a perspective view schematically illustrating a state after the locking tongue in the seat belt device of the first embodiment has rotated.

FIG. 6 is a perspective view schematically illustrating a state after the locking tongue in the seat belt device of the first embodiment has rotated.

Figure 7:
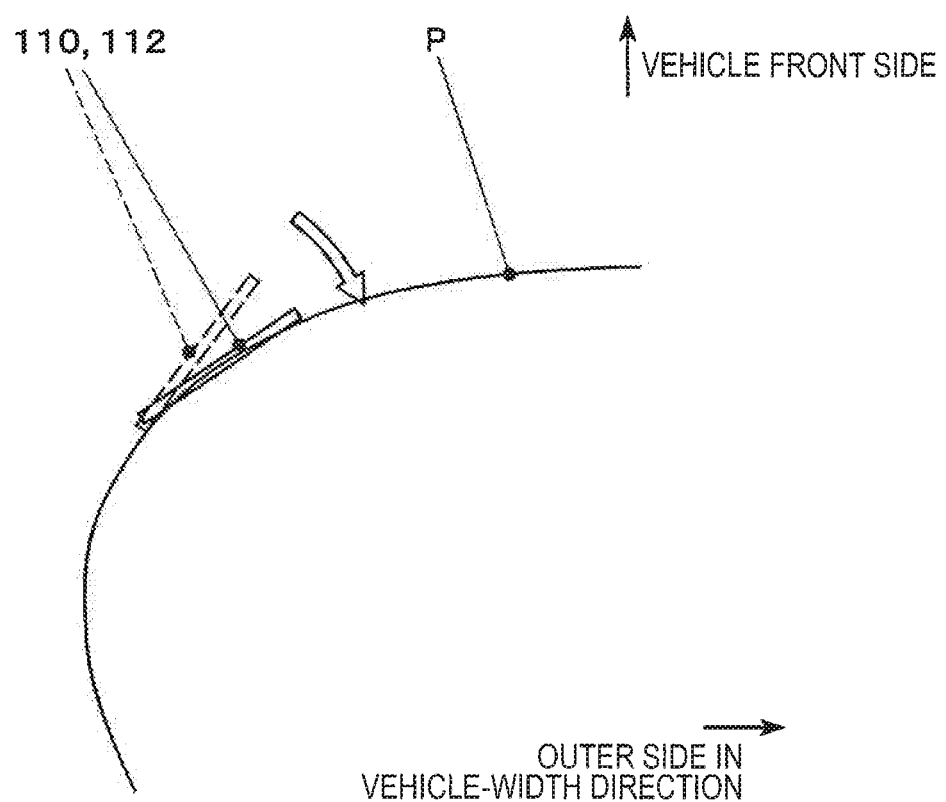
FIG. 7 is a schematic sectional view of a portion along arrow VII-VII in FIG. 6.
Figure 8:
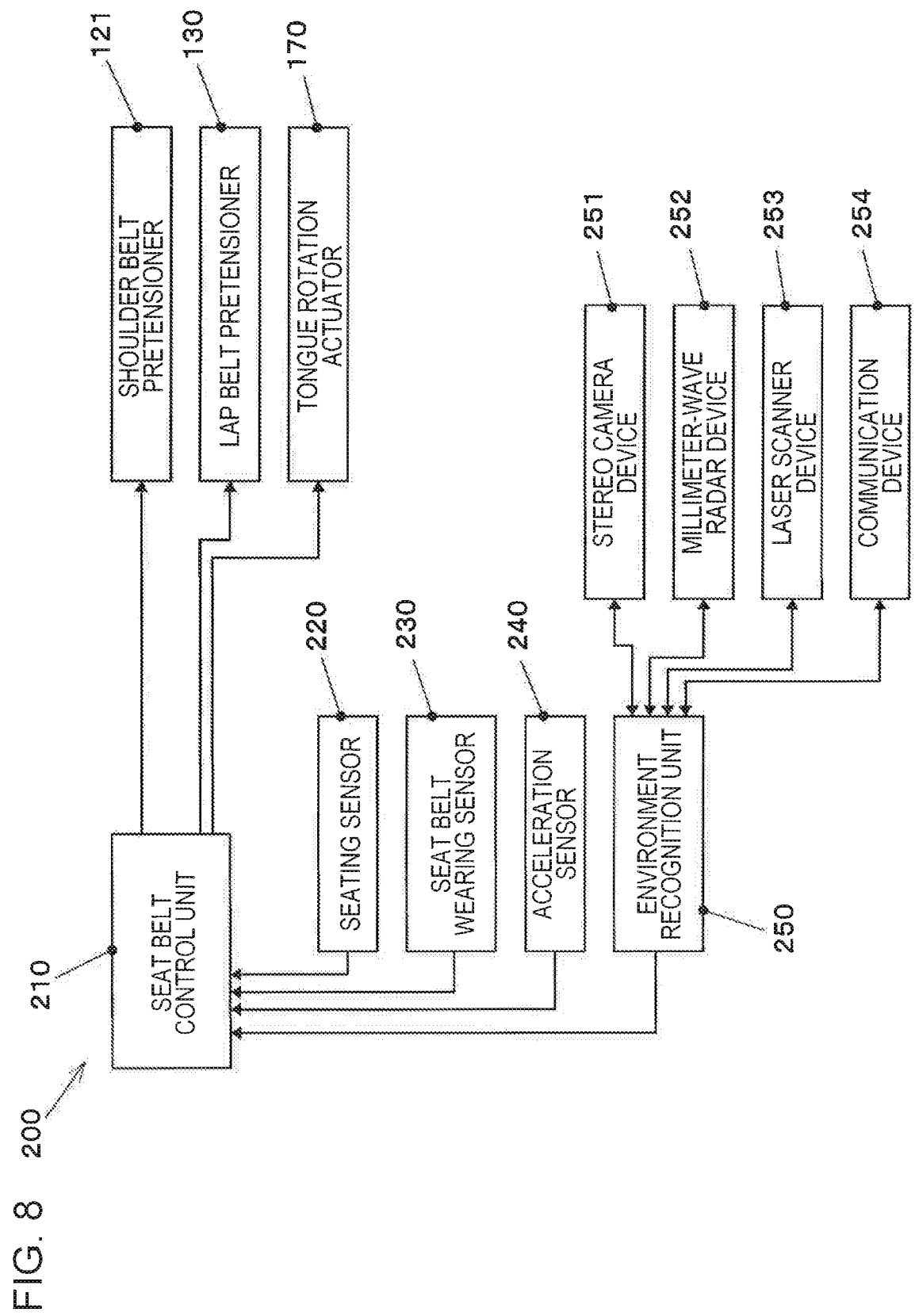
FIG. 8 is a block diagram schematically illustrating a configuration of a control system in a seat belt device according to a second embodiment the disclosure.

FIG. 7 is a schematic sectional view of a portion along arrow VII-VII in FIG. 6.

By rotating the main body 151 of the locking tongue 150 with respect to the tongue plate holder 157, the shoulder belt 112 is, in a region thereof that is in contact with the occupant P from the chest to the abdomen (region adjacent to the locking tongue 150), twisted in a direction in which a lower edge of the webbing 110 retreats with respect to an upper edge thereof.

Thereafter, when, at time T4, the tension of the webbing 110 is further increased, the locking tongue 150 is brought into a lock state.

Thereafter, a forward movement of the upper part of the body of the occupant P is increased and the tension of the shoulder belt 112 is further increased.

The first embodiment described above makes it possible to provide the following effects.

(1) In accordance with a collision or a warning of a collision, it is possible to bring the shoulder belt 112 into contact with the chest of the occupant P in a wide range in a width direction by rotating the main body 151 of the locking tongue 150 and twisting the shoulder belt 112.

Therefore, it is possible to reduce the possibility of the shoulder belt 112 from being raised onto the chest when the shoulder belt 112 is in a high-friction state caused by one edge side of the shoulder belt 112 in the width direction alone coming into contact with and being caught by the chest of the occupant P.

(2) It is possible to increase the possibility of providing the effects above by causing the main body 151 of the locking tongue 150 to rotate in a direction in which the lower edge of the shoulder belt 112 retreats with respect to the upper edge thereof.

(3) By disposing the shaft 158*a*, which is the center axis when the main body 151 of the locking tongue 150 rotates, closer to the upper edge of the shoulder belt 112 than to the lower edge of the shoulder belt 112 in the vicinity of the locking tongue 150, it is possible to reduce the possibility of the upper edge of the shoulder belt 112 being raised and separated from the chest of the occupant P, and to promote the effects above.

(4) By disposing the tongue rotation mechanism 158 that converts the tension generated in the webbing 110 into rotation force that rotates the main body 151 of the locking tongue 150, it is possible to rotate the main body 151 of the locking tongue 150 in accordance with an increase in the tension of the webbing 110 and it is possible not to use, for example, a dedicated actuator for rotating the main body 151, as a result of which it is possible to simplify the structure of the device.

(5) By disposing the rotation lock mechanism 159 that restricts the rotation of the main body 151 of the locking tongue 150 at the time of ordinary use and that allows the rotation of the main body 151 in accordance with a collision or a warning of a collision of the vehicle, it is possible to reduce any influence on the usability of the seat belt device 100 at the time of ordinary use.

(6) By using, as a tongue, the locking tongue 150 that reduces a movement of the webbing 110 toward the side of the shoulder belt 112 and the side of the lap belt 111 in accordance with a collision or warning of a collision of the vehicle, the locking tongue 150 is brought into a lock state in accordance with the collision or the warning of the collision, and thus it is possible to reduce the possibility of increasing harm to, for example, the ribs caused by the tension of the shoulder belt 112 increasing excessively.

By reducing changes in the length of the shoulder belt 112 before and after a collision, it is possible to properly control the state of contact between the shoulder belt 112 and the upper part of the body of the occupant P.

Second Embodiment

Next, a second embodiment of the disclosure is described.

In each embodiment described below, corresponding portions to those of the previous embodiment are given the same reference signs are not described below. The differences are primarily described.

FIG. 3 is a block diagram schematically illustrating a configuration of a control system in a seat belt device of the second embodiment.

In the second embodiment, instead of using the passive tongue rotation mechanism 158 utilizing the tension of the webbing 110 in the first embodiment described above, a tongue rotation actuator 170 is used to rotate a main body 151 of a locking tongue 150 with respect to a buckle 160 and a tongue plate holder 157.

As the tongue rotation actuator 170, for example, an actuator using an explosive gas-generating device or an electric actuator can be used.

The second embodiment described above makes it possible to further increase the possibility of providing the effects that are the same as those provided by the first embodiment (excluding the effect described in item (4)) by increasing the freedom with which the timing of rotating the locking tongue 150 is controlled.

Third Embodiment

Next, a third embodiment of the disclosure is described.

Figure 9:
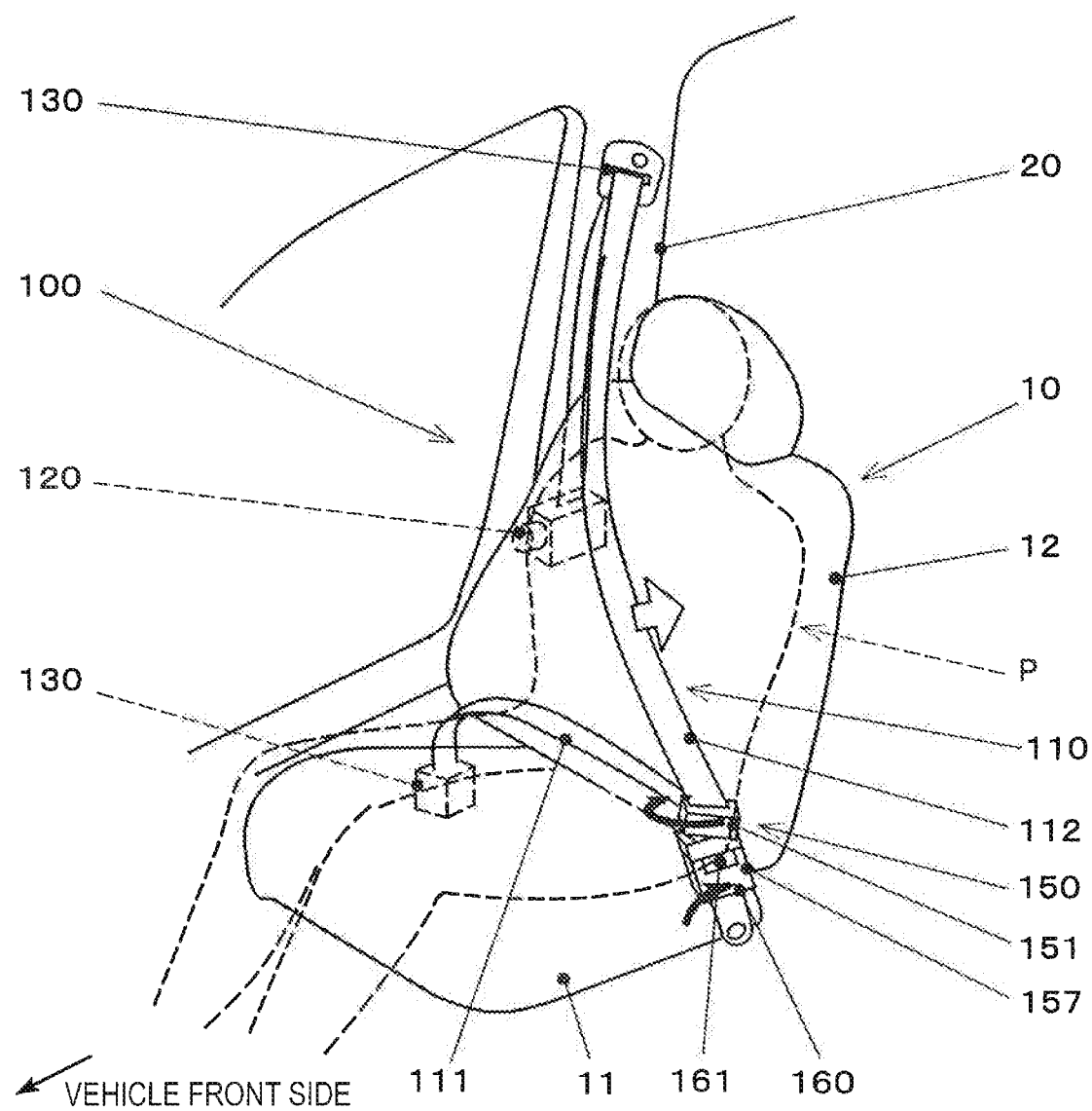
FIG. 9 is a perspective view schematically illustrating a state after a locking tongue in a seat belt device according to a third embodiment of the disclosure has rotated.

FIG. 9 is a perspective view schematically illustrating a state after a locking tongue in a seat belt device of the third embodiment has rotated.

In the seat belt device of the third embodiment, a main body 151 of a locking tongue 150 is rotated (oscillated) in accordance with a collision or a warning of a collision of a vehicle, and, with a portion of a buckle 160 that is mounted on a seat 10 being a fulcrum, the locking tongue 150 and the buckle 160 are rotated (oscillated) around an axis, which extends in a vehicle-width direction, in a direction in which the locking tongue 150 moves upward and retreats.

The locking tongue 150 and the buckle 160 can be rotated in such a manner by, for example, providing a tongue upward-movement mechanism at a base of the buckle 160, the tongue upward-movement mechanism including an actuator that is controlled by a seat belt control unit 210.

A one-way lock (one-way clutch) that rotates in one direction when an external force larger than or equal to a predetermined external force acts thereupon may be provided at the base of the buckle 160 to rotate the locking tongue 150 and the buckle 160 by a tension acting in a direction in which a shoulder belt 112 lifts the locking tongue 150.

The third embodiment described above, in addition to providing the effects that are the same as those provided by the first embodiment described above, makes it possible to increase the height of a portion of the shoulder belt 112 in contact with the chest of the occupant P to make it possible to reduce the possibility of the shoulder belt 112 being raised onto and along the chest of the occupant from below each rib.

Fourth Embodiment

Next, a fourth embodiment of the disclosure is described.

Figure 10:
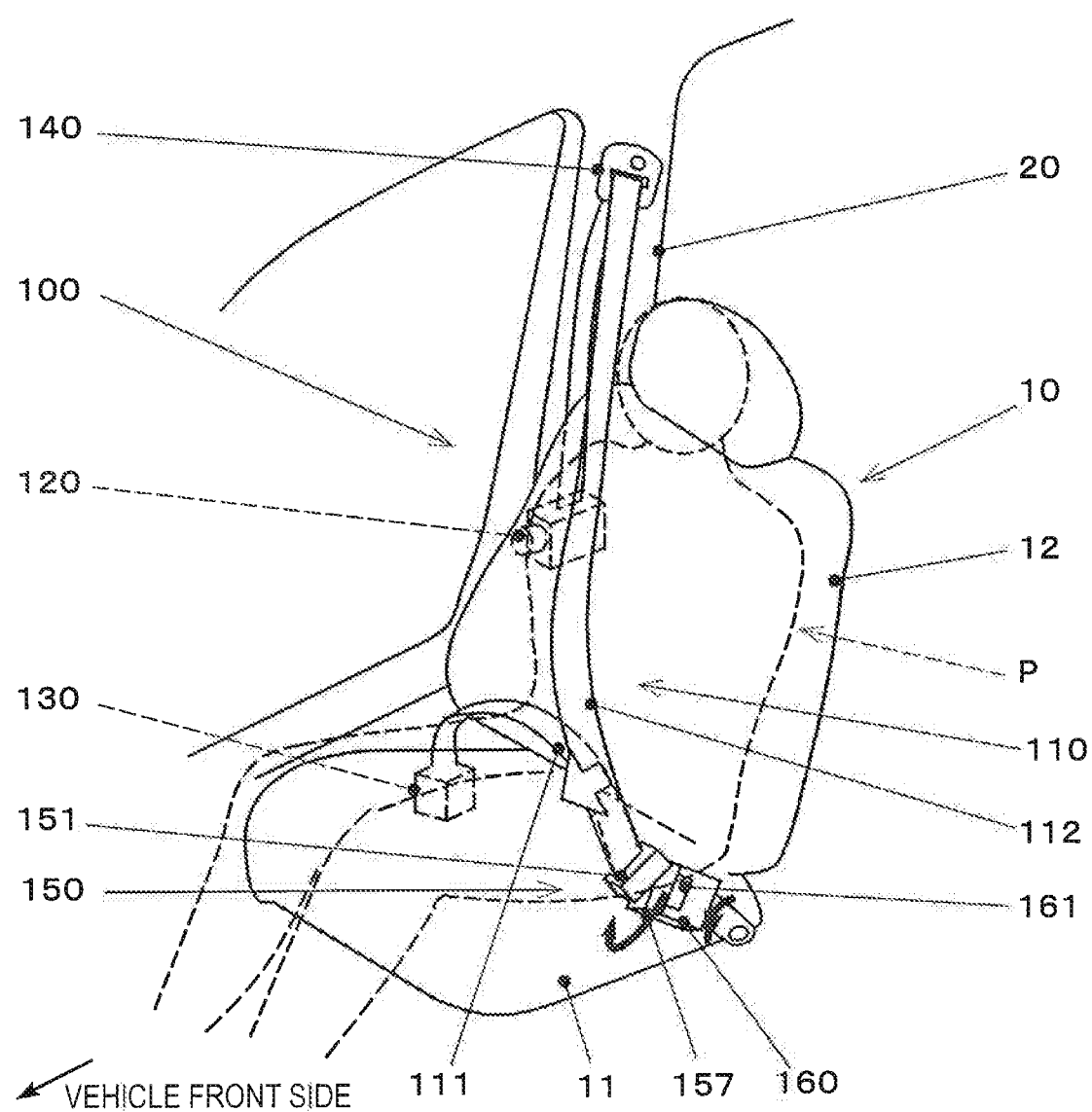
FIG. 10 is a perspective view schematically illustrating a state after a locking tongue in a seat belt device according to a fourth embodiment of the disclosure has rotated.

FIG. 10 is a perspective view schematically illustrating a state after a locking tongue in a seat belt device of the fourth embodiment has rotated.

In the seat belt device of the fourth embodiment, a main body 151 of a locking tongue 150 is rotated (oscillated) in accordance with a collision or a warning of a collision of a vehicle, and, with a portion of a buckle 160 that is mounted on a seat 10 being a fulcrum, the locking tongue 150 and the buckle 160 are rotated (oscillated) around an axis, which extends in a vehicle-width direction, in a direction in which the locking tongue 150 moves downward and forward.

The locking tongue 150 and the buckle 160 can be rotated in such a manner by, for example, providing a tongue downward-movement mechanism at a base of the buckle 160, the tongue downward-movement mechanism including an actuator that is controlled by a seat belt control unit 210.

A one-way lock (one-way clutch) that rotates in one direction when an external force larger than or equal to a predetermined external force acts thereupon may be provided at the base of the buckle 160 to rotate the locking tongue 150 and the buckle 160 by a tension acting in a direction in which a lap belt 111 pulls the locking tongue 150 in a forward direction.

The fourth embodiment described above, in addition to providing the effects that are the same as those provided by the first embodiment described above, makes it possible to lower the locking tongue 150 in accordance with a collision or a warning of a collision to lower the position of a shoulder belt 112 that is placed on the chest and to thus make it possible to further reduce the possibility of the shoulder belt being raised onto and interfering with the ribs.

Modifications

The disclosure is not limited to the embodiments described above and can be variously modified and changed. Such modifications and changes are within the technical scope of the disclosure.

(1) The structure of the vehicle and the structure of the seat belt device are not limited to those of the embodiments described above and can be changed as appropriate.

For example, the shapes, the structures, the functions, the dispositions, and the number of the components constituting the seat belt can be changed as appropriate.

(2) Although, in each embodiment, the locking tongue is a passive tongue that performs a locking operation in accordance with an increase in the tension of the webbing, the disclosure is not limited thereto. The locking tongue may be an active locking tongue that performs a locking operation by using an actuator that is controlled by a control device.

The structure of the passive locking tongue is also not limited to those of the embodiments, and can be changed as appropriate.

(3) Although, in each embodiment, the tongue rotation mechanism that rotates the tongue and twists the shoulder belt is provided in the locking tongue, such a tongue rotation mechanism may be provided in the buckle to rotate both the buckle and the tongue.

As described above, according to the disclosure, it is possible to provide a seat belt device that makes it possible to reduce compression of the chest by a shoulder belt.

The invention claimed is:

1. A seat belt device comprising:
a webbing comprising a lap belt and a shoulder belt, at least a portion of the lap belt being configured to be disposed to extend in a vehicle-width direction along a front of an abdomen of an occupant, at least a portion of the shoulder belt being configured to be disposed obliquely along a front of a chest of the occupant; and
a tongue provided between the lap belt and the shoulder belt of the webbing and configured to be coupled to a vehicle body when the tongue is mounted,
wherein the tongue rotates in accordance with a collision or a warning of the collision of a vehicle in a direction in which the shoulder belt is twisted with respect to the vehicle body.

2. The seat belt device according to claim 1, wherein a center axis when the tongue rotates is disposed closer to an upper edge of the shoulder belt than to a lower edge of the shoulder belt in a vicinity of the tongue.

3. The seat belt device according to claim 1, further comprising:
a tongue rotation mechanism configured to convert a tension that is generated in the webbing into a rotation force that rotates the tongue.

4. The seat belt device according to claim 1, further comprising:
a tongue rotation mechanism configured to rotate the tongue by using an actuator, and
a controller configured to operate the actuator in accordance with the collision or the warning of the collision of the vehicle.

5. The seat belt device according to claim 1, further comprising:
a rotation lock mechanism configured to restrict a rotation of the tongue at a time of ordinary use and to allow a rotation of the tongue in accordance with the collision or the warning of the collision of the vehicle.

6. The seat belt device according to claim 1, further comprising:
a tongue upward-movement mechanism configured to move the tongue upward with respect to the vehicle body in accordance with the collision or the warning of the collision of the vehicle.

7. The seat belt device according to claim 1, further comprising:
a tongue downward-movement mechanism configured to move the tongue downward with respect to the vehicle body in accordance with the collision or the warning of the collision of the vehicle.

8. The seat belt device according to claim 1, wherein the tongue is a locking tongue configured to reduce a movement of the webbing toward a side of the shoulder belt and a side of the lap belt in accordance with the collision or the warning of the collision of the vehicle.

9. The seat belt device according to claim 1, wherein the tongue rotates in accordance with the collision or the warning of the collision of the vehicle in a direction in which a lower edge of the shoulder belt retreats with respect to an upper edge of the shoulder belt in relation to a time of ordinary use.

10. The seat belt device according to claim 9, wherein a center axis when the tongue rotates is disposed closer to an upper edge of the shoulder belt than to a lower edge of the shoulder belt in a vicinity of the tongue.

11. The seat belt device according to claim 9, further comprising:
a tongue rotation mechanism configured to convert a tension that is generated in the webbing into a rotation force that rotates the tongue.

12. The seat belt device according to claim 9, further comprising:
a tongue rotation mechanism configured to rotate the tongue by using an actuator, and
a controller configured to operate the actuator in accordance with the collision or the warning of the collision of the vehicle.

13. The seat belt device according to claim 9, further comprising:
a rotation lock mechanism configured to restrict a rotation of the tongue at a time of ordinary use and to allow a rotation of the tongue in accordance with the collision or the warning of the collision of the vehicle.

14. The seat belt device according to claim 9, further comprising:
a tongue upward-movement mechanism configured to move the tongue upward with respect to the vehicle body in accordance with the collision or the warning of the collision of the vehicle.

15. The seat belt device according to claim 9, further comprising:
a tongue downward-movement mechanism configured to move the tongue downward with respect to the vehicle body in accordance with the collision or the warning of the collision of the vehicle.

16. The seat belt device according to claim 9, wherein the tongue is a locking tongue configured to reduce a movement of the webbing toward a side of the shoulder belt and a side of the lap belt in accordance with the collision or the warning of the collision of the vehicle.

* * * * *